United States Patent
Whitney et al.

(10) Patent No.: US 11,774,958 B2
(45) Date of Patent: Oct. 3, 2023

(54) VEHICLE CONTROL BY A REMOTE OPERATOR

(71) Applicant: Zimeno, Inc., Livermore, CA (US)

(72) Inventors: Christopher Travis Whitney, Palo Alto, CA (US); Rama Venkata Surya Kumar Varma Bhupatiraju, Milpitas, CA (US); Mizbauddin Mohammed, Fremont, CA (US); Bhargav Ramakrishna Reddy, Fremont, CA (US); Praveen V. Penmetsa, Newark, CA (US); Zachary M. Omohundro, Carson, CA (US)

(73) Assignee: Zimeno, Inc., Livermore, CA (US)

( * ) Notice: Subject to any disclaimer, the term of this patent is extended or adjusted under 35 U.S.C. 154(b) by 0 days.

(21) Appl. No.: 18/090,450

(22) Filed: Dec. 28, 2022

(65) Prior Publication Data
US 2023/0136169 A1    May 4, 2023

Related U.S. Application Data

(63) Continuation of application No. 17/114,231, filed on Dec. 7, 2020, now Pat. No. 11,567,492.
(Continued)

(51) Int. Cl.
*G05D 1/00* (2006.01)
*B60R 25/23* (2013.01)
(Continued)

(52) U.S. Cl.
CPC .......... *G05D 1/0016* (2013.01); *B60K 17/28* (2013.01); *B60Q 1/44* (2013.01); *B60Q 1/46* (2013.01);
(Continued)

(58) Field of Classification Search
CPC .. G05D 1/0016; G05D 1/0038; G05D 1/0094; G05D 1/0223; G05D 1/0231;
(Continued)

(56) References Cited

U.S. PATENT DOCUMENTS 6,377,872 B1 * 4/2002 Struckman .............. E02F 9/205
                                                          700/258
7,598,942 B2   10/2009 Underkoffler et al.
(Continued)

FOREIGN PATENT DOCUMENTS

CA          3054631          12/2018
CA          3054631 A1  *   12/2018  ............... B60R 1/00
(Continued)

OTHER PUBLICATIONS

PCT International Search Report for PCT/US2021013530 dated Mar. 19, 2021.

*Primary Examiner* — Muhammad Shafi
(74) *Attorney, Agent, or Firm* — Rathe Lindenbaum LLP

(57) ABSTRACT

A vehicle is operable in a first mode in which vehicle actions are controlled in response to inputs received by an input device carried by the vehicle from an operator while being boarded on the vehicle and in a second mode in which vehicle actions are controlled in response to inputs received from the operator while the operator is proximate the vehicle, but no longer boarded on the vehicle. The vehicle carries a sensor configured to output a sensed input, as sensed by the sensor, from the operator proximate the vehicle, but not boarded on the vehicle. The sensed input is recognized and associated with a vehicle action and control signals are output to the vehicle based on the sensed input to cause the vehicle to carry out the vehicle action.

19 Claims, 10 Drawing Sheets

Related U.S. Application Data

(60) Provisional application No. 62/962,752, filed on Jan. 17, 2020.

(51) Int. Cl.
    *B60Q 1/44*     (2006.01)
    *B60Q 5/00*     (2006.01)
    *B60Q 1/46*     (2006.01)
    *B60K 17/28*     (2006.01)
    *G05D 1/02*     (2020.01)
    *B60R 25/24*     (2013.01)
    *B60R 25/25*     (2013.01)
    *G06F 16/40*     (2019.01)
    *B60Q 1/50*     (2006.01)
    *G06N 3/042*     (2023.01)

(52) U.S. Cl.
CPC ............ *B60Q 1/50* (2013.01); *B60Q 5/001* (2013.01); *B60R 25/23* (2013.01); *B60R 25/24* (2013.01); *B60R 25/25* (2013.01); *G05D 1/0038* (2013.01); *G05D 1/0094* (2013.01); *G05D 1/0223* (2013.01); *G05D 1/0231* (2013.01); *G06F 16/40* (2019.01); *G05D 1/0022* (2013.01); *G05D 2201/0201* (2013.01); *G06N 3/042* (2023.01)

(58) Field of Classification Search
CPC ......... G05D 1/0022; G05D 2201/0201; G05D 1/0033; B60K 17/28; B60Q 1/24; B60Q 1/44; B60Q 1/46; B60Q 5/001; B60Q 1/2611; B60Q 1/50; B60Q 2800/20; B60R 25/23; B60R 25/24; B60R 25/25; G06F 16/40; G06N 3/0427; B60Y 2200/221; B60Y 2300/1888
USPC .......................................................... 701/2
See application file for complete search history.

(56) References Cited

U.S. PATENT DOCUMENTS

| | | | |
|---|---|---|---|
| 8,531,396 | B2 | 9/2013 | Underkoffler et al. |
| 8,896,531 | B2 | 11/2014 | Minnen et al. |
| 8,941,588 | B2 | 1/2015 | Minnen et al. |
| 8,989,972 | B2 | 3/2015 | Anderson |
| 9,849,828 | B2 | 12/2017 | Foster et al. |
| 9,910,497 | B2 | 3/2018 | Kramer et al. |
| 10,162,422 | B2* | 12/2018 | Bodensteiner ........ H04W 4/021 |
| 10,166,995 | B2* | 1/2019 | Beauvais ............. B60R 25/257 |
| 11,163,292 | B2* | 11/2021 | Adler ..................... G08C 17/02 |
| 2009/0278915 | A1 | 11/2009 | Kramer et al. |
| 2014/0324272 | A1 | 10/2014 | Madsen et al. |
| 2016/0348504 | A1 | 12/2016 | Hanski et al. |
| 2017/0168501 | A1* | 6/2017 | Ogura ................. G05D 1/0278 |
| 2017/0192428 | A1 | 7/2017 | Vogt et al. |
| 2017/0248946 | A1* | 8/2017 | Ogura ................. G05D 1/0038 |
| 2019/0200166 | A1 | 6/2019 | Ikeda et al. |
| 2020/0011034 | A1* | 1/2020 | Atkinson ................ E02F 9/205 |
| 2021/0029872 | A1* | 2/2021 | Brandt ................. A01D 34/008 |

FOREIGN PATENT DOCUMENTS

| | | | | |
|---|---|---|---|---|
| CN | 110199666 | | 9/2019 | |
| CN | 110199666 | A * | 9/2019 | ........ A01D 41/1278 |
| EP | 2921325 | A1 | 9/2015 | |
| JP | 2019052890 | | 4/2019 | |
| WO | WO2018179778 | | 10/2018 | |
| WO | WO-2018179778 | A1 * | 10/2018 | ............. A01B 69/00 |

\* cited by examiner

VEHICLE CONTROL BY A REMOTE OPERATOR

CROSS-REFERENCE TO RELATED PATENT APPLICATIONS

The present application claims priority under 35 USC § 120 from co-pending U.S. patent application Ser. No. 17/114,231 filed on Dec. 7, 2020, by Whitney et al, which claims priority under 35 USC § 119 from U.S. Provisional Patent Application Ser. No. 62/962,752 filed on Jan. 17, 2020, by Whitney et al. and entitled VEHICLE CONTROL BY A REMOTE OPERATOR, the full disclosures of which are hereby incorporated by reference.

BACKGROUND

Vehicles may perform various vehicle actions in response to inputs or commands from an operator. For example, the direction in which a vehicle travels and/or speed of travel may be controlled by an operator sitting in the vehicle and manipulating a steering wheel, joystick, accelerator pedal, brake pedal and the like. Various attachments or extensions of the vehicle may also be controlled from the operator sitting or otherwise boarded upon the vehicle.

Figure 1:
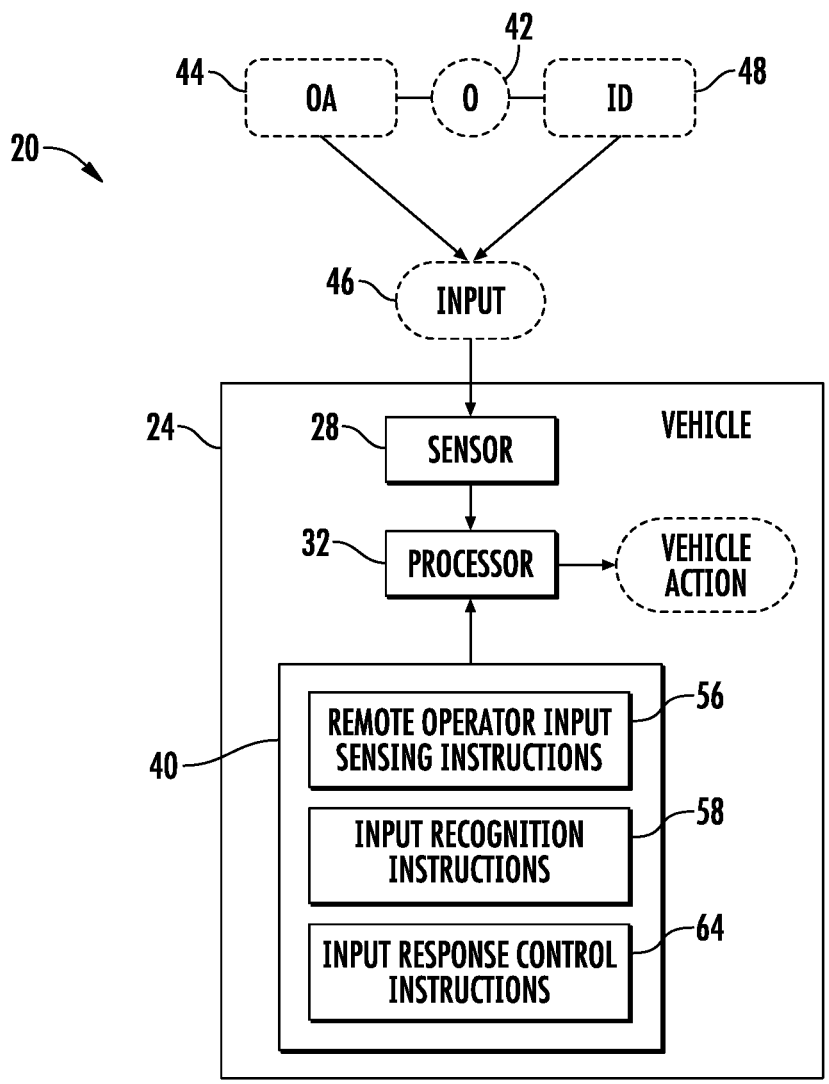
FIG. 1 is a block diagram schematically illustrating portions of an example vehicle control system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are vehicle control systems, methods and mediums that facilitate control of a vehicle by an operator remote from the vehicle. As a result, vehicle actions that might otherwise demand multiple persons, one person remote from the vehicle on the ground and another person boarded upon the vehicle and controlling the vehicle may be carried out by a single operator. As a result, vehicle actions that might otherwise demand that an operator boarding the vehicle repeatedly leave the vehicle to get a new perspective then re-boarding the vehicle may be performed with fewer or no re-boards.

For purposes of disclosure, the term "remote", when referring to an operator, means that the operator is locally located with respect to the direct control devices of the vehicle such as a steering wheel, joystick, acceleration or brake pedals, gearshift levers, push buttons, switches, other levers and the like. In some implementations, a remote operator may be an operator that is standing on a part of the vehicle or an attachment of the vehicle, but wherein the operator cannot access the steering wheel or other input controls of the vehicle. For example, an operator may be located on a platform, bucket, or other attachment of the vehicle, but cannot readily ask the steering will other input controls of the vehicle. In some implementations, a remote operator may be an operator that is not boarded upon the vehicle. For example, a remote operator may be an operator standing on the ground in front of, behind of or to a side of the vehicle. In some implementations, a remote operator may be an operator that is standing or otherwise carried by an implement being pushed or pulled by the vehicle. In each case, the operator is remote from the direct control structures (steering wheel, joystick, push buttons, switches, levers, and the like) of the vehicle.

In some implementations, a remote operator may be an operator that cannot readily reach, contact or physically access the direct input interfaces for a particular vehicle action, wherein disclosed vehicle control systems, methods and mediums facilitate initiating, stopping or adjusting such vehicle actions by an operator through the use of direct or indirect gestures by the operator that are sensed by a sensor of the vehicle. Direct gestures comprise movement or positioning of the operator's anatomy such as movement or positioning of the operator's hands, arms, or legs. Indirect gestures of an operator may comprise manual movement or positioning of an input device by an operator, wherein the movement or positioning of the input device is sensed by sensor of the vehicle. In such circumstances, an operator who is positioned so as to not be able to physically contact and move a direct input device (steering wheel, joystick, push buttons, switches, levers and the like) for a desired vehicle action may still provide input to the vehicle initiating, stopping or adjusting such a vehicle action.

FIG. 1 is a block diagram schematically illustrating an example vehicle control system 20. Vehicle control system 20 comprises vehicle 24, sensor 28, processor 32 and a non-transitory computer-readable medium 40. Vehicle 24 comprises a self-propelled vehicle. Examples of vehicle 24 include, but not limited to, trucks, cars, tractors, harvesters, riding lawnmowers, snow throwers, four wheelers, all-terrain vehicles, and the like.

Sensor 28 comprises at least one sensor carried by vehicle 24 that is supported by vehicle 24 so as to be able to sense direct or indirect gestures initiated by an operator 42. The direct gestures provided by operator 42 may be provided by the operator's anatomy 44, such as a movement or positioning of the operator's hands, fingers, legs, torso, or the like. The movement, positioning/orientation of the operator's anatomy may serve as input 46 which is sensed by sensor 28. Indirect gestures initiated by operator 42 may involve the movement and/or positioning of an input device 48 which serves as input 46. The input device 48 may comprise a flag, a baton, a smart phone or other handheld or portable physical structure that may be manually manipulated by the operator 42 and that is recognizable by sensor 28.

Sensor 28 may have varying fields of view or sensing ranges. In some implementations, particular regions about vehicle 24 that are within the particular field of view of at least one of sensors 28 may be designated for providing remote input to vehicle 24. In other implementations, the at least one sensor 28 may have a field-of-view or multiple fields of view that encompass an entire area about vehicle 24 such that a remote operator may provide remote input at any of various possible locations about vehicle 24.

In some implementations, sensor 28 comprises at least one camera supported by vehicle 24. In other implementations, sensor 28 may comprise other forms of non-contact or wireless sensors such as lidar, radar, ultrasonic sensors, and the like. In some implementations, different types of sensors may be provided at different locations about the vehicle.

Processor 32 and medium 40 form a controller for vehicle 24. Although processor 32 and medium 40 are illustrated as being part of or carried by vehicle 24, in some implementations, processor 32 and medium 40 may be located remote from vehicle 24, not being carried by vehicle 24. In such implementations, the controller formed by processor 32 and medium 40 may communicate with a local controller on vehicle 24 in a wireless manner. Processor 32 carries out instructions provided in medium 40. Medium 40 may contain additional instructions (not illustrated) for controlling other operations of vehicle 24.

Medium 40 may be in the form of software or coding on a flash drive, memory disk, or the like and/or hardware in the form of logic elements on a circuit board. The instructions contained in medium 40, that direct processor 32, comprise remote operator input sensing instructions 56, input recognition instructions 58 and input response control instructions 64. Remote operator input sensing instructions 56 comprise instructions configured to obtain sensed input from the remote operator 42. Such instruction direct processor 32 to pull or otherwise acquire signals from sensor 28 indicating the positioning and/or movement of operator anatomy 44 and/or input device 48. Instructions 56 may further direct processor 32 to determine such positioning or movement from the signals provided by sensor 28.

In one implementation, system 20 is selectively actuatable between different modes. In a first mode, sensor 28 may sense the positioning and/or movement of operator anatomy 44 and use such positioning and/or movement to control actions of vehicle 24. In a second mode, sensor 28 may sense the positioning and/or movement of input device 48 and use such positioning and/or movement to control actions of vehicle 24. In some implementations, the acquisition of signals from sensor 28 for facilitating remote control of vehicle 24 and/or the generation of control signals for one or more vehicle actions based upon a sensed gesture of operator 42 may be continuous or may be initiated in response to an input provided by the operator 42 through a direct input control, such as while the operator is boarded upon vehicle 24. In some implementations, the acquisition of signals from sensor 28 for facilitating remote control of vehicle 24 and/or the generation of control signals for one or more vehicle actions based upon a sensed gesture of operator 42 may be triggered or initiated in response to signals indicating that the operator is no longer boarded upon vehicle 24. For example, in some implementations, sensor 28 and/or the remote-control process of system 20 may be in a dormant mode and may be woken in response to signals from a sensor indicating that the operator has left vehicle 24. In one implementation, one or more sensors may be located below the operator's chair or seat in vehicle 24, wherein the sensor 28 and/or the remote-control process provided by system 20 may be awoken in response to such sensors indicating that the operator is no longer seated.

Input recognition instructions 58 comprise instructions configured to direct processor 32 to recognize and associate sensed input with a particular requested vehicle action. For example, an operator 42 pointing his or her hand in a downward direction may be interpreted as a command to decrease the forward or rearward velocity of the vehicle, whereas the operator 42 pointing his hand in an upward direction may be interpreted as a command to increase the forward or rearward velocity. An operator 42 pointing input device 48 in a downward direction may be interpreted as a command to decrease the forward or rearward velocity of the vehicle, whereas the operator 42 pointing the input device 48 in an upward direction may be interpreted as command to increase the forward or rearward velocity. The operator 42 pointing his hand in a leftward direction or pointing the input device 48 in the leftward direction may be interpreted as a command to turn the vehicle in a leftward direction, wherein the duration which the hand is pointed in the left direction indicates the extent or angle of the turn. An operator pointing his or her hand or input device directly at vehicle 24 may be interpreted as a command to back up the vehicle.

In one implementation, input recognition instructions 58 may direct processor 32 to discern between the operator's left-hand and right-hand, wherein different gestures provided by the left-hander the right hand (or an input device carried by the left-hand or right-hand), may be interpreted as different commands. For example, gestured by the left-hand may be interpreted as providing commands for the speed of the vehicle whereas gestures provided by the right hand may be interpreted as providing commands for movement of an attachment or implement of the vehicle.

In one implementation, medium 40 may additionally include a database or lookup table associating different sensed inputs (different sensed gestures) with different vehicle commands or actions. In some implementations, the database may be local, carried by vehicle 24. In other implementations, the database may be remote from vehicle 24. In some implementations, the database may be a generic database provided by a remote server, wherein the database is accessible to multiple different vehicles 24 and different systems 20 being operated by different operators 42. In some implementations, the database may be specific to the particular operator 42. In some implementations, the database may be part of a neural network that is been trained using images, videos or other sets of sensed data, or the neural network recognizes different gestures and associates such gestures with different vehicle action commands or requests.

In some implementations, the input recognition instructions 58 may have different databases of associated commands and gestures for different individual sensors 28 supported at different positions by vehicle 24. A gesture received from a first sensor at a first location may correspond to a first vehicle action while the same gesture received from a second sensor at a second different location may correspond to a second different vehicle action. In some implementations, different sensors supported at different locations or positions on the vehicle may be dedicated or assigned to different vehicle actions. For example, a first sensor or group of sensors at a first location on a vehicle may be dedicated to receiving direct or indirect gestures for controlling a first type of vehicle action while a second sensor or a second group of sensors at a second location on the vehicle may be dedicated to receiving direct or indirect gestures for controlling a second different type of vehicle action. By way of a more specific example, a first sensor supported at a front end of a vehicle may be dedicated to receiving direct or indirect gestures for controlling the positioning of an attachment extending from the front of the vehicle, whereas a second sensor supported at a rear end of the vehicle may be dedicated to receiving direct or indirect gestures for controlling the positioning of an attachment extending from the rear of the vehicle. In some implementations, for an operator to provide remote input for a particular vehicle action, the operator must position himself or herself at a pre-determined or designated remote location relative to the vehicle such that his or her direct or indirect gestures are captured by the appropriate sensor that is designated for the desired vehicle action.

With such example implementations, an operator may be prevented from inadvertently providing an incorrect gesture for an incorrect command. For example, in one implementation, gestures associated with forward movement of the harvester may be only received from sensors positioned along or facing a side or rear of the vehicle 24. Sensors facing a front to vehicle 24 may be dedicated to other vehicle actions, but not forward movement of vehicle 24. In such implementations, the operator may be required to be along a side or rear of the vehicle, rather than in front of the vehicle when instructing forward movement of the vehicle.

By way of another example, one or more sensors having a field-of-view encompassing a power take off of the vehicle may be blocked or not be associated with receiving gestures corresponding to commands to turn on the power take off. In other words, only sensed gestures from sensors 28 having a field-of-view sufficiently distant from the power take off may be used to turn on the power take off. In such implementations, such assignment of sensors to particular vehicle actions may prevent an operator from becoming accidentally entangled in the power take off.

In some implementations, the association of different gestures with different requests or commands for particular vehicle actions may be additionally based upon other sensed parameters. For example, when vehicle 24 is carrying out a first operation or is in a first date (as sensed by sensors or otherwise determined by processor 32), recognition instructions 58 may direct processor 32 to consult a first table or database of gesture-vehicle action associations. When vehicle 24 is carrying out a second different operation or is in a second different state, recognition instructions 58 may direct processor 32 to consult a second table or database containing different gesture-vehicle action associations. By way of a specific example, instructions 58 may direct processor 32 to consult different databases containing different gesture-vehicle action associations depending upon the type or characteristics of attachment connected to vehicle 24 or depending upon the type or characteristic of the particular implement currently being pushed or pulled by vehicle 24. The type or characteristics of the attachment or implement may be input by the operator or may be sensed.

Input response control instructions 64 comprise instructions configured to output control signals to various actuators or the like of vehicle 24 to cause vehicle 24 to carry out the particular vehicle action corresponding to the sensed input as determined by instructions 58. Examples of various vehicle actions that may be associated with particular gestures (direct or indirect) from operator 42 in which may be carried out in response thereto include, but are not limited to vehicle actions consisting of: forward velocity, backward velocity, left/right direction, braking, lights (nightlights, running lights, spotlights), signal, sound (horn, loudspeaker), warning (flashing lights, hazard lights), implement specific actions (left sprayer on/off, right sprayer on/off, left implement wing raising and lowering, right implement wing raising and lowering, power take-up, moving a discharge spout, changing operational speed of the auger of a discharge spout, turning on/off of a power take off, adjusting a speed of the power takeoff, raising/lowering an attachment to the vehicle (such as a bucket, fork or the like), adjusting the supply of hydraulic fluid or hydraulic power to implement or attachment, raising/lowering a three point hitch in the like.

Figure 2:
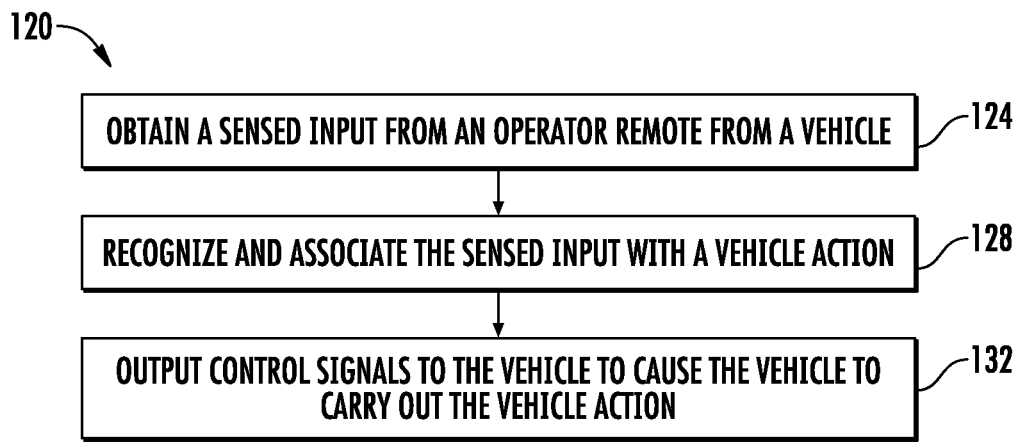
FIG. 2 is a flow diagram of an example vehicle control method.

FIG. 2 is a flow diagram of an example vehicle control method 120. Although method 120 is described in the context of being carried out by system 20, it should be appreciated method 120 may likewise be carried out with any of the following described systems or with similar systems. As indicated by block 124, processor 32 may obtain a sensed input from an operator 42 remote from vehicle 24. The sensed input may be acquired from at least one sensor 28 carried by vehicle 24.

As indicated by block 128, processor 32 may recognize and associate the sensed input with a particular requested or commanded vehicle action. As described above, such association may be through the consultation of a local or remote database or lookup table associating different sensed inputs/gestures with different vehicle actions. In some implementations, the determination of the particular requested vehicle action corresponding to the sense input or gesture may additionally be based upon from which particular sensor 28 the sensed gesture was received and/or the particular state of vehicle 24, including the state or characteristic of any implement or attachment associated with vehicle 24. In some implementations, the operator 42 or other manager may provide system 20 with selections identifying which particular vehicle actions may be requested through the use of remote sensed gestures. For example, a database may include a multitude of available vehicle actions that may be controlled through the use of remote gestures, but where the operator or another person may authorize only a portion or a selected group of such available vehicle actions for control through remote gestures.

As indicated by block 132, processor 32 may output control signals to the vehicle 24 to cause a vehicle 24 to carry out the particular vehicle action currently associated with the sensed input/gesture from the remote operator 42. As described above, examples of such vehicle actions include, but are not limited to, forward velocity, backward velocity, left/right direction, braking, lights (nightlights, running lights, spotlights), signal, sound (horn, loudspeaker), warning (flashing lights, hazard lights), implement specific actions (left sprayer on/off, right sprayer on/off, left implement wing raising and lowering, right implement wing raising and lowering, power take-up, moving a discharge spout, changing operational speed of the auger of a discharge spout, turning on/off of a power take off, adjusting a speed of the power takeoff, raising/lowering an attachment to the vehicle (such as a bucket, fork or the like), adjusting the supply of hydraulic fluid or hydraulic power to an implement or attachment, raising/lowering of a three point hitch and the like.

Figure 3:
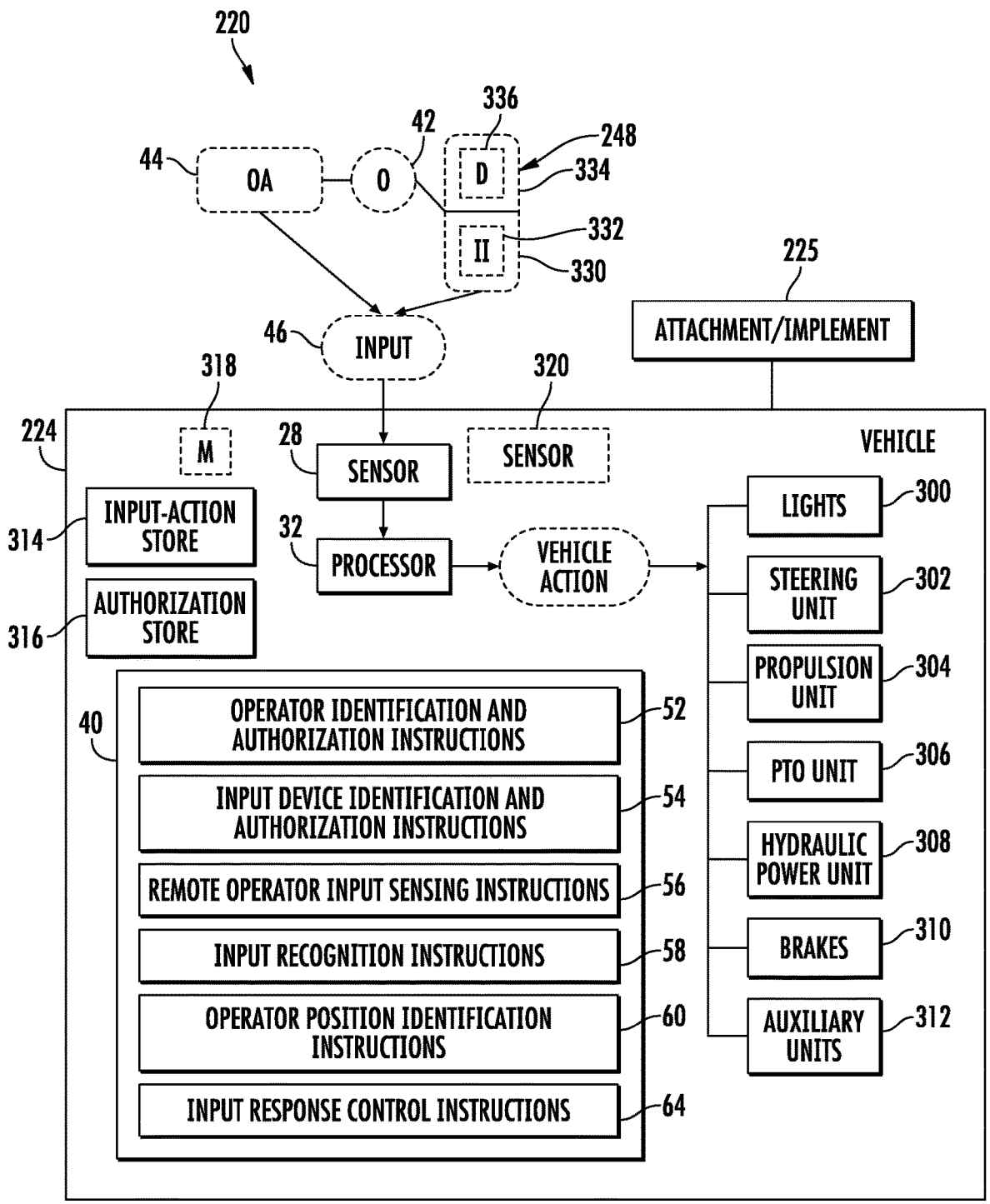
FIG. 3 is a block diagram schematically illustrating portions of an example vehicle control system.

FIG. 3 is a block diagram schematically illustrated portions of an example vehicle control system 220. Vehicle control system 220 is similar to vehicle control system 20 described above except that vehicle control system 220 comprises vehicle 224 and input device 248 in place of vehicle 24 and input device 48. Vehicle 224 the additionally illustrated as being coupled to an attachment/implement 225.

Vehicle 224 is itself similar to vehicle 24 except that vehicle 224 is illustrated as specifically comprising lights 300, steering unit 302, propulsion unit 304, power take off (PTO) unit 306, hydraulic power unit 308, brakes 310 and auxiliary units 312. Vehicle 224 additionally comprises input-action store 314, authorization store 316, microphone 318 and sensor 320. Medium 40 additionally comprises operator identification and authorization instructions 52, input device identification and authorization instructions 54 and operator position identification instructions 60. The remaining components of vehicle 224 and system 220 which correspond to components of system 20 are numbered similarly.

Lights 300 comprise light supported by vehicle 224 for providing illumination about vehicle 224 or for providing alerts or notifications for vehicle 224. Steering unit 302 comprises electrical and/or hydraulic components and associated controllers that effectuate turning of the wheels, tracks, or the like to steer forward or rearward travel of vehicle 224. Propulsion unit 304 comprises an internal combustion engine, electric motor, transmission, and associated controllers for controlling the forward and rearward propulsion of vehicle 224. PTO unit 306 comprises an electrical, hydraulic, or mechanical drive and associate controllers for rotating the power take off (such as a projecting spline) for supplying torque to a fitting associated with an attachment or implement. Hydraulic power unit 308 comprises hydraulic pumps, valves, and associated controllers for supplying pressurized hydraulic fluid to portions of vehicle 224 or to attachments/implements powered by such pressurized hydraulic fluid from vehicle 224. Brakes 310 comprise devices for braking, slowing down the propulsion of vehicle 224. Auxiliary units 312 comprise movable or actuator components of vehicle 224. For example, auxiliary units 312 may comprise discharge spouts of a harvester, wherein the positioning of the discharge spout and/or the rotation of an auger of the discharge spout are adjustable.

Attachment/implement 225 comprises an attachment carried by vehicle 224 and/or an implement being pushed or pulled by vehicle 224. An attachment may be in the form of a bucket, blade, harvester head or the like. Examples of an implement may include any of a variety of implement such as wagons, carts, plows, discs, choppers, balers, sprayers, and the like. As discussed above, vehicle actions may involve repositioning such attachments are implements or adjusting the supply of power to such attachments or implements. The association of particular gestures to particular inputs/commands may vary depending upon what particular attachment implement is coupled to vehicle 224 and/or the current state of the particular attachment or implement coupled to vehicle 224. The same director indirect gesture may be associated with different commands depending upon the particular attachment or implement coupled to vehicle 224 and/or the current state of the particular attachment or implement coupled to vehicle 224.

Input-action store 314 comprises one or more databases or lookup tables linking various sensed gestures (direct or indirect) to associated requests or commands for vehicle actions.

Authorization store 316 comprises one or more databases or lookup tables identifying preauthorized operators and/or preauthorized input devices 248 for providing gestures for inputting requests or commands for vehicle actions. For example, authorization store 316 may comprise photographs of authorized operators 42, wherein authorization of an operator may be determined by comparing captured images of a candidate operator 42 and the photographs contained in the store 316. Authorization store 316 may comprise a pre-assigned set of passwords, wherein authorization for an operator 42 or an input device 248 may be determined by comparing a received password input through microphone 318 to the store 316. Authorization store 316 may comprise barcode values or other signatures for authorize input devices 248. Input-action store 314 and authorization store 316 may be contained on medium 540 carried by vehicle 524 or may be stored in a remote memory or server, wherein vehicle 524 accesses stores 314, 316 through a wireless communication connection with the remote memory or server.

Operator identification and authorization instructions 52 comprise instructions for directing processor 32 to identify and authorize a candidate operator 42 for providing direct gestures for providing remote control commands for vehicle 224. Instructions 52 may direct sensor 28 or an alternative sensor, such as sensor 320 (in the form of a camera or other sensor) to capture images of operator 42 and then compare the received information or data to information found in authorization store 316. Based on such comparison, the operator 42 may be authorized for providing direct gestures for use in remotely controlling vehicle 224.

Input device identification and authorization instructions 54 comprise instructions for directing processor 32 to identify and authorize a candidate input device 248 doe providing direct gestures for providing remote control commands for vehicle 224. Instructions 54 may direct sensor 28 or an alternative sensor, such as sensor 320 (in the form of a camera or other sensor) to capture images a barcode or other indicia of input device 248 or receive an identification/authorization signal from input device 248, and then compare the received information or data to information found in authorization store 316. Based on such comparison, the input device 248 may be authorized for providing indirect gestures for use in remotely controlling vehicle 224.

Operator position identification instructions 60 comprise instructions that direct processor 32 to identify the positioning of the remote operator 42 relative to vehicle 224. Based upon the determined relative positioning, such instructions may further direct processor 32 to either outputting notification to the operator 42 recommending that the operator move relative to the vehicle or automatically interrupt the requested vehicle action corresponding to the sensed operator input/gesture. In such a fashion, instructions 60 may prevent vehicle actions from being carried out when the operator may be too close or out of position with respect to vehicle 224 for the vehicle action being requested.

Input device 248 comprises a handheld device to be manually manipulated, moved, or positioned by operator 42. Input device 248 comprises a first face 330 having an input identifier 332. Input identifier 332 is recognizable by sensor 28 and processor 32 following input recognition instructions 58. In some implementations, input identifier 332 may comprise flashing lights, particular patterns or shades of the color or other characteristics readily perceptible by sensor 28 to facilitate the sensing of the positioning and/or movement of input device 248.

Input device 248 additionally comprises a second opposite face 334 having a display 336. In one implementation, signals from sensor 28 or sensor 320 may be transmitted to input device 248, wherein a depiction of the region surrounding vehicle 224, based upon such signals, is presented on display 336. For example, one of sensor 28, 320 may comprise a camera carried by vehicle 224. The captured images may be transmitted to input device 248 and presented on display 336. As a result, the operator 42 providing remote commands to vehicle 224 may make such gestures and provide such commands based upon not only on his or her perspective which is remote from vehicle 224 but also based upon the perspective of the sensors 28 or 320 taken from the perspective of vehicle 224. Thus, the operator may make a more informed decisions regarding such remote commands. In one implementation, input device 248 may comprise a smart phone that wirelessly communicates with the controller provided by processor 32 and medium 40, wherein the positioning or movement of the smart phone serves as a remote gesture for providing remote commands to vehicle 224.

Figure 4:
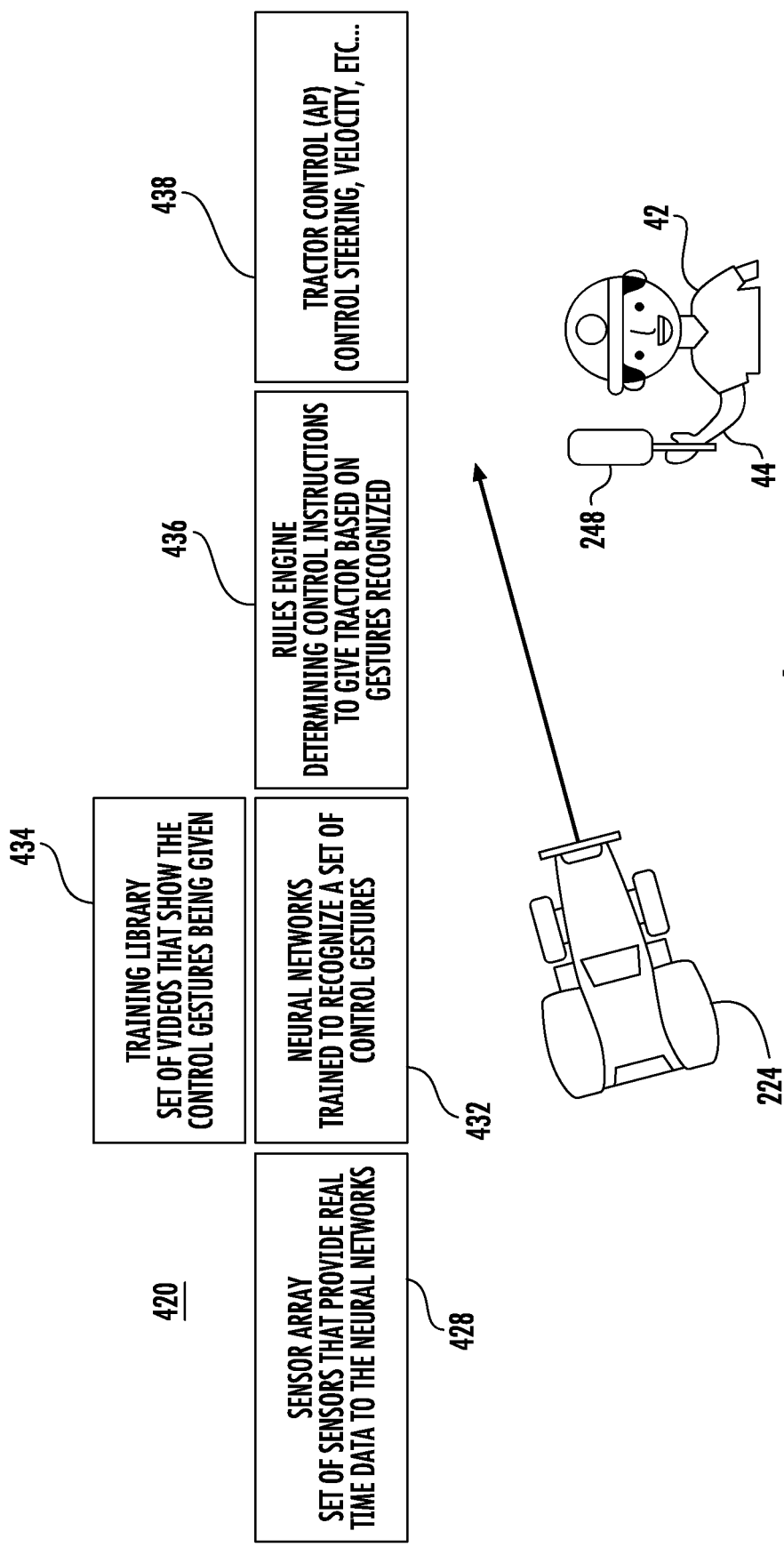
FIG. 4 is a block diagram schematically illustrating portions of an example vehicle control system.
Figure 5:
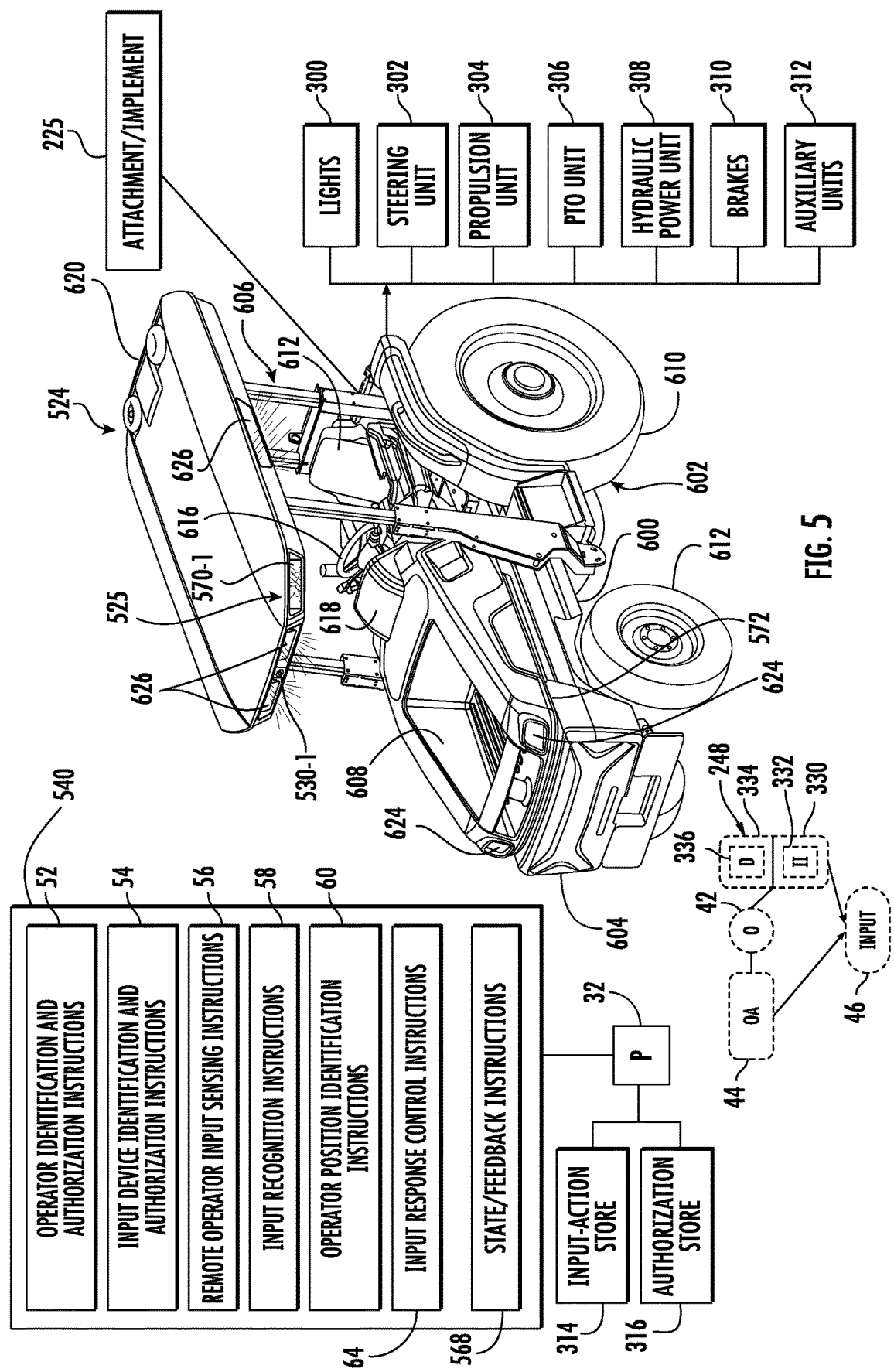
FIG. 5 is a front perspective view of an example vehicle control system.
Figure 6:
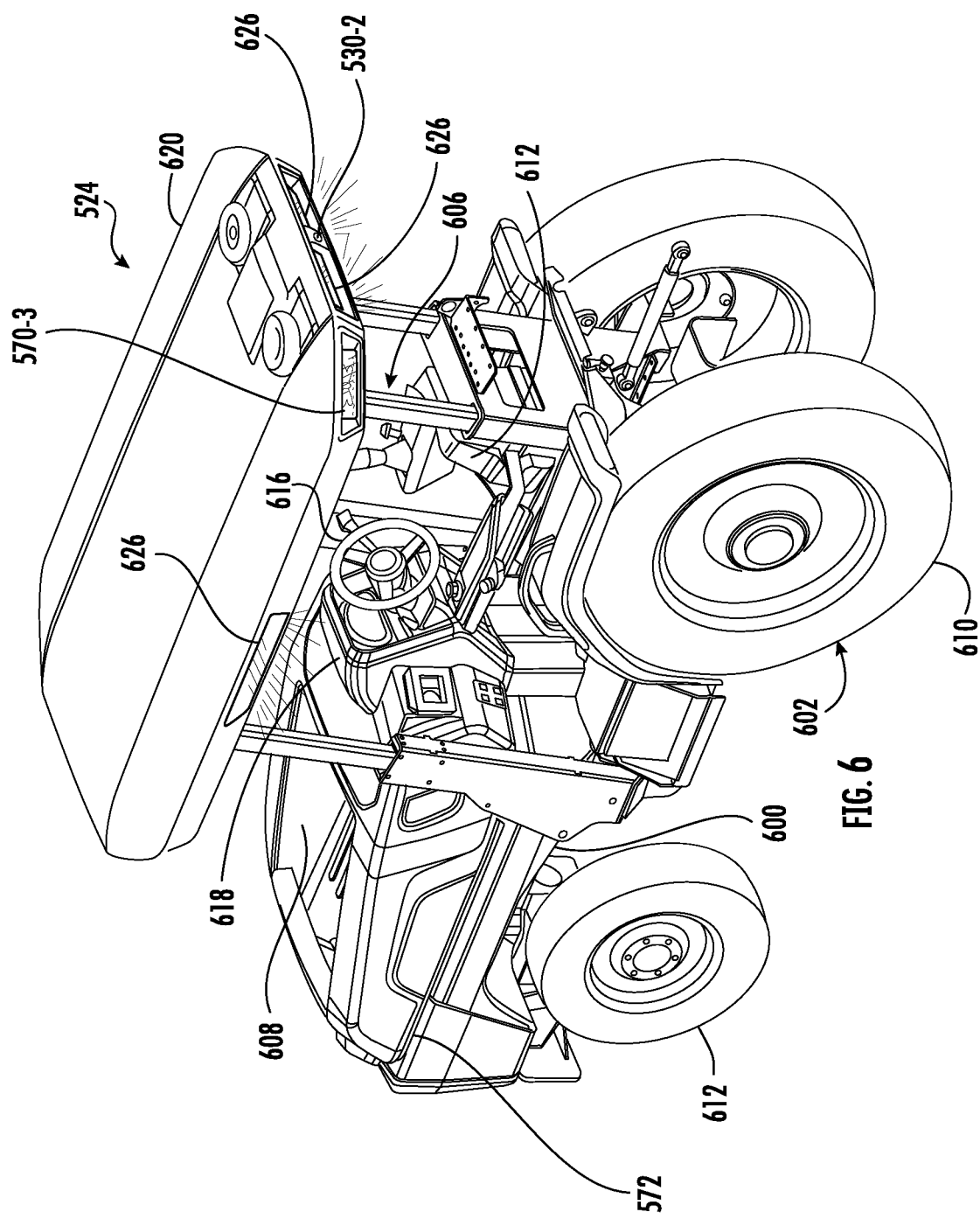
FIG. 6 is a rear perspective view of the example vehicle control system.
Figure 7:
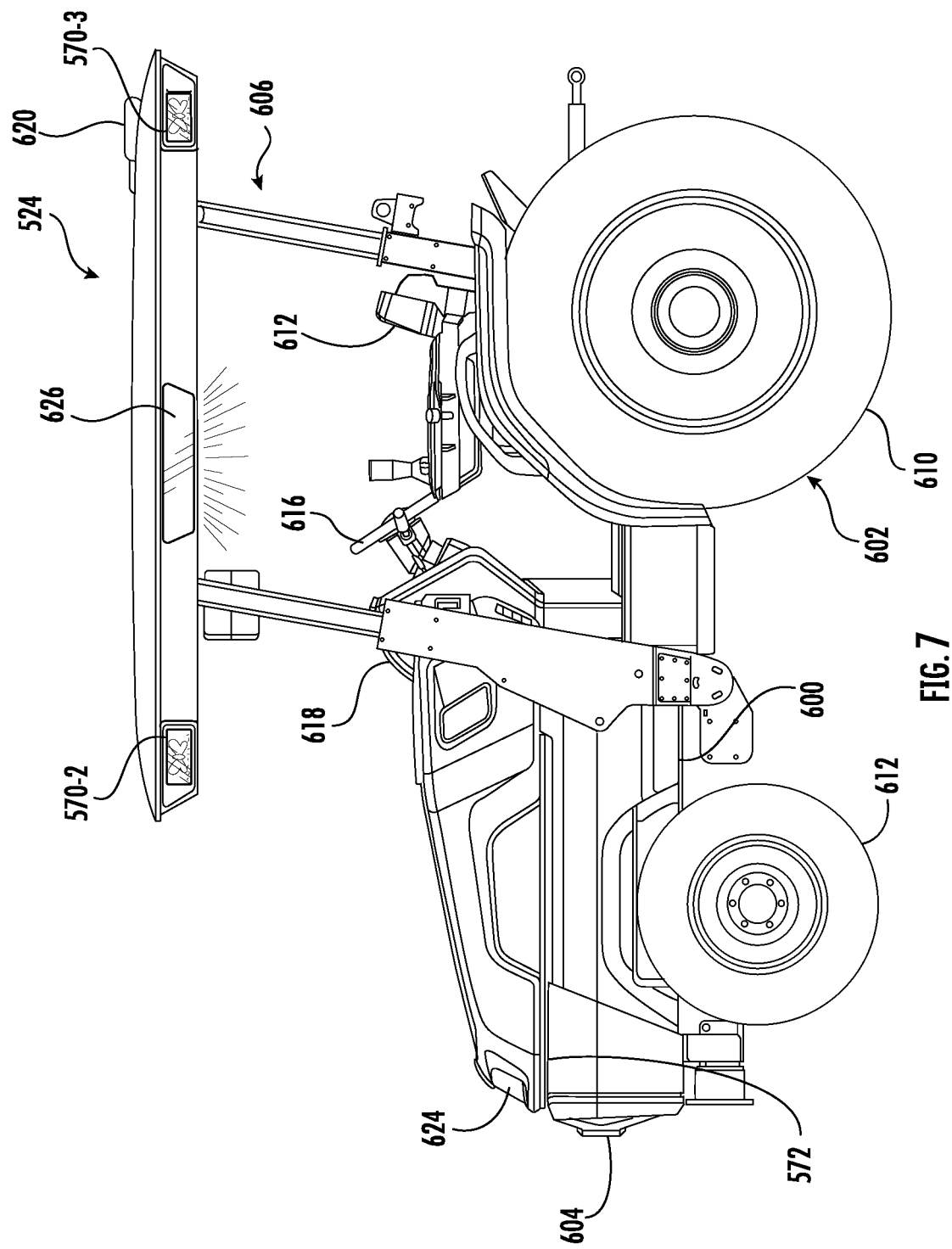
FIG. 7 is a right-side view of the example vehicle control system.
Figure 8:
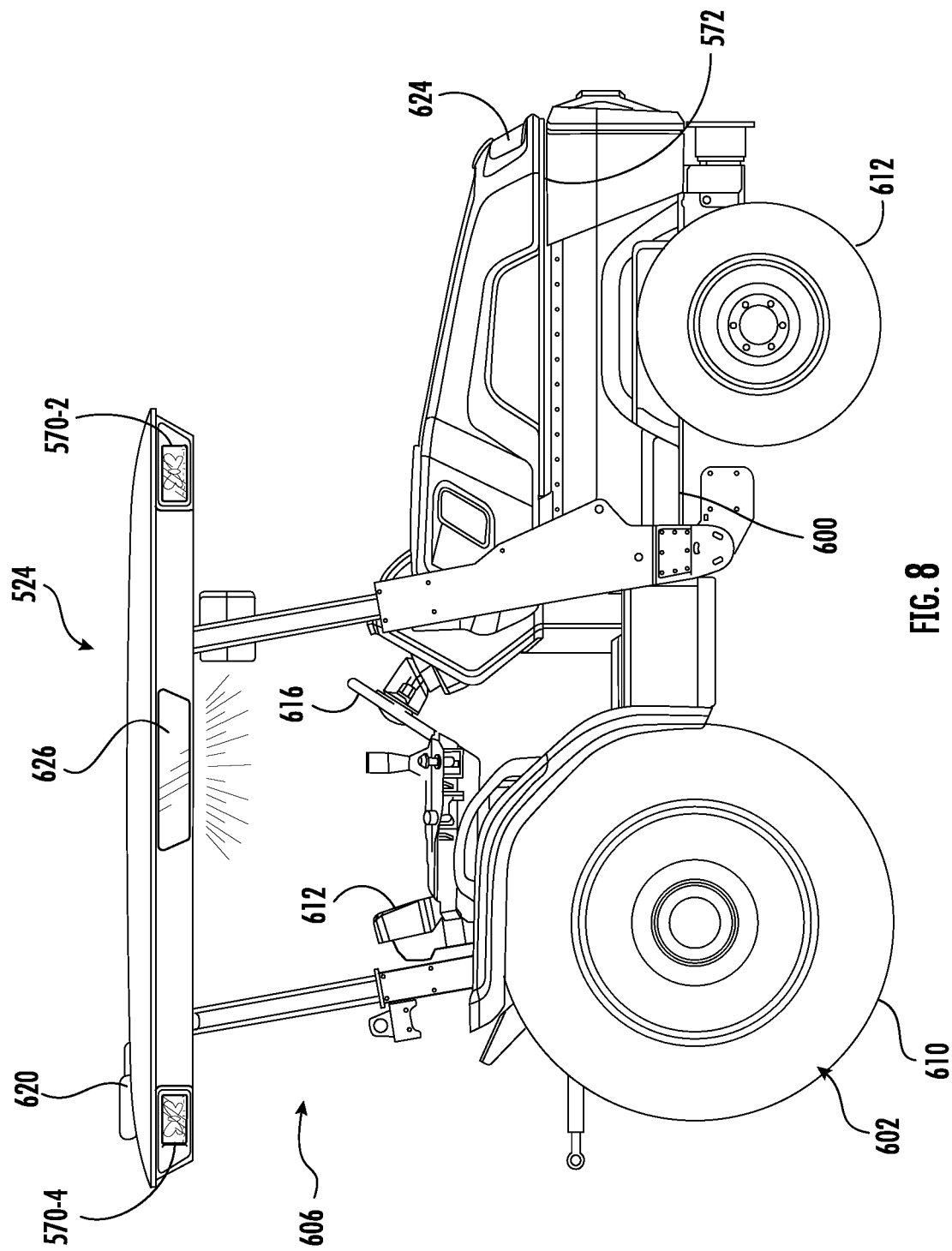
FIG. 8 is a left side view of the example vehicle control system.
Figure 9:
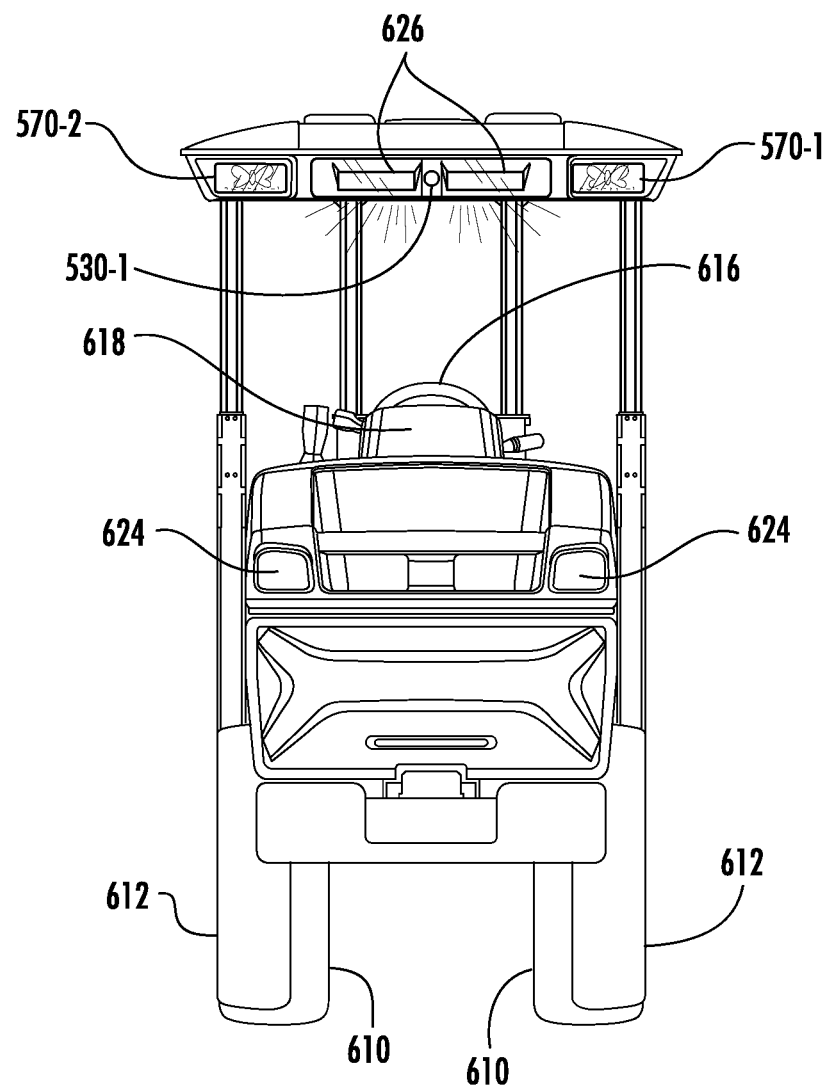
FIG. 9 is a front view of the example vehicle control system.
Figure 10:
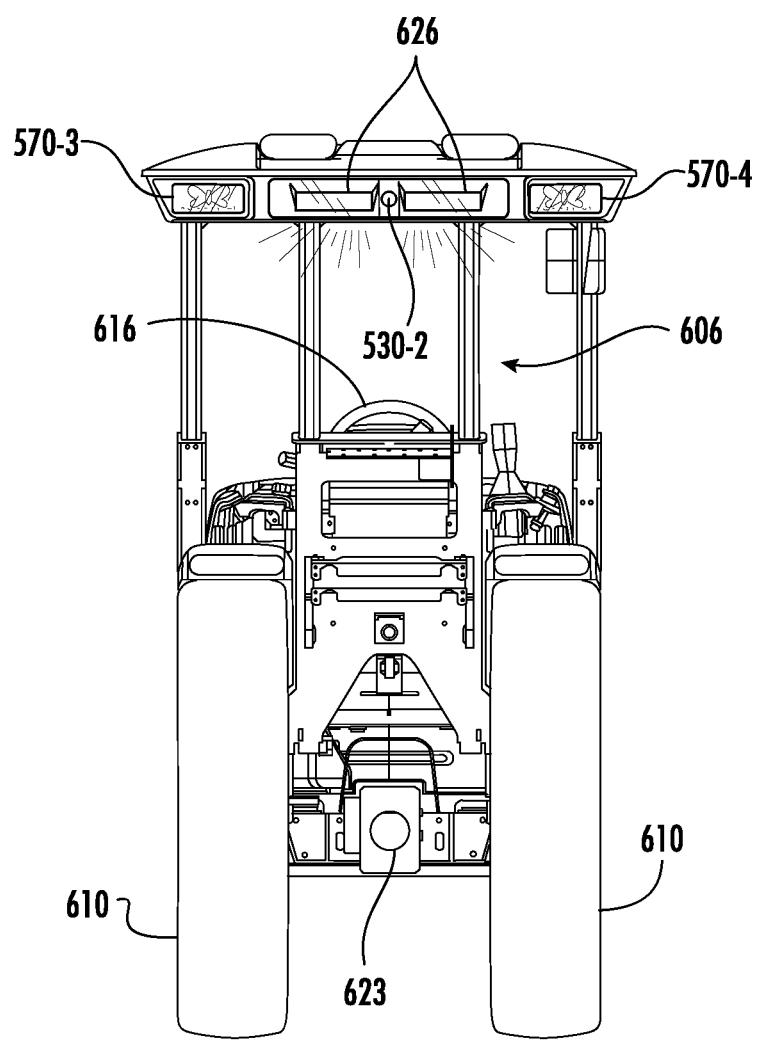
FIG. 10 right side rear view of the example vehicle control system.
Figure 11:
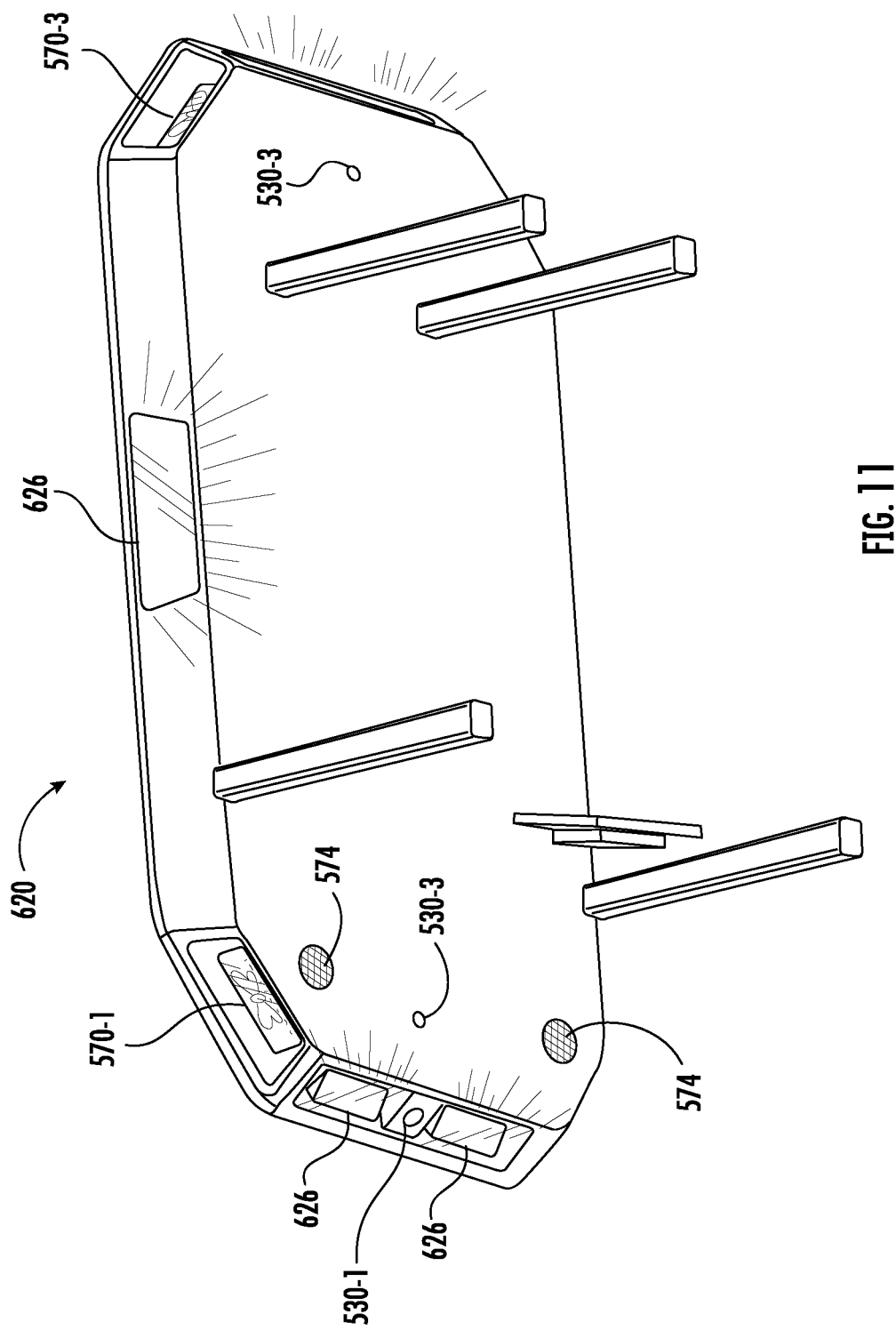
FIG. 11 is a bottom perspective view of the example vehicle control system taken along line 11-11 of FIG. 2.

FIG. 4 is a schematic view illustrated portions of an example vehicle control system 420. As shown by FIG. 4, system 420 allows a driver to control the motion of a tractor, and actions of tools/devices attached to it whilst being physically removed from the tractor (such as standing in front of it). Sensors are mounted on the tractor so that the tractor can collect sensor data. The tractor analyzes the data to look for gestures that it has been trained to recognize. The tractor takes appropriate control changes dependent upon the gestures recognized. This system can be used to perform such tasks as instructing a tractor to follow the driver around a field or positioning a tractor within a closed space (such as garage).

As shown by FIG. 4, vehicle control system 420 comprises a sensor array 428 in the form of a set of sensors that sense and output real-time data regarding the input provided by operator 42 either through his or her anatomy 44 or through an input device, such as input device 248. The sensed data is transmitted to neural networks 432 which are trained to recognize a set of control gestures or inputs. Such recognition may be based upon training library 434 which may comprise a set of videos that show control gestures being given.

Vehicle control system 420 may further comprise rules engine 436 which comprises a processor and a non-transitory computer-readable medium that outputs control instructions for vehicle 224, in the form of a tractor, based upon the gestures or input identified by neural networks 432. As indicated by block 438, operation of vehicle 224 is adjusted based upon the control instructions. Such control instructions may involve steering, velocity and the like as described above. For example, such control instructions may control the operation of lights 300, steering unit 302, propulsion unit 304, PTO unit 306, hydraulic power unit 308, brakes 310 and/or auxiliary unit 312.

FIGS. 5-11 illustrate an example vehicle control system 520 for a vehicle 524 in the form of a tractor. Vehicle 524 is similar to vehicle 224 except that vehicle 524 additionally comprises vehicle state and feedback system 525. Vehicle state and feedback system 525 provides an operator, remote from vehicle 524, with visible and/or audible feedback regarding the state of vehicle 524. Such feedback may include the speed or rate at which the vehicle is traveling, the speed or state of an implement and/or the state of any of lights 300, steering unit 302, propulsion unit 304, PTO unit 308, brakes 310 auxiliary unit 312. Such feedback may include a confirmation of receipt or capture of gestures from the operator (either operator anatomy 44 and/or input device 248), a confirmation of recognition of such gestures, an indication that such commands are about to be executed, a request for the operator repeating such gestures, and/or an indication that the commands associated with such gestures will not be carried out given the current state of vehicle 524 or the operator's position relative to vehicle 524 and/or its implements.

Vehicle 524 may be used for a variety of purposes in agricultural construction and residential purposes. Vehicle 524 may be used to push or pull an implement. Vehicle 524 may include attachments, such as a bucket, blade, backhoe, or the like for digging, displacing, and/or carrying various materials such as earthen materials, animal waste and produce. Vehicle 524 may include forks or other coupling mechanisms for engaging pallets, bins, boxes, or the like, wherein the tractors carry and/or lift the engaged items.

Vehicle 524 comprises chassis 600, ground propulsion members 602, battery 604, and vehicle cab 606. Vehicle 524 further comprises lights 300, steering unit 302, propulsion unit 304, PTO unit 306, hydraulic power unit 308, brakes 310 and auxiliary unit 312. Chassis 600 comprises a frame supporting the remaining components of vehicle 524. In the example illustrated, chassis 600 comprises a front cargo bed 608 for storing and transporting cargo. In the example illustrated, chassis 600 is further configured for connection to an attachment/implement 225. In the example illustrated, propulsion unit 304 comprises an electric motor driven by electrical power supplied by a battery.

Ground propulsion members 602 comprise members that engage the underlying terrain in which are driven by propulsion unit 304. In the example illustrated, ground propulsion members 602 comprise rear wheels 610 and front wheels 612. In the example illustrated, rear wheel 610 are driven by propulsion unit 304 while front wheels 612 are manipulated or turned by steering unit 302. In other implementations, ground propulsion members 602 may comprise tracks or other ground engaging members.

Battery 604 comprises a battery unit that is removably received within a corresponding chamber or cavity extending rearwardly from the front of chassis 600. Battery 604 mates with a corresponding connection interface for transferring electrical power from battery 604 to the electrically powered components of vehicle 524. In other implementations, battery 604 may be located at other locations. In other implementations, battery 604 may be fixed and non-swappable or not removable. In the example illustrated, battery 604 electrically powers propulsion unit 304 which drives rear wheel 610. In the example illustrated, battery 604 electrically powers hydraulic motors or pumps of hydraulic power unit 308, steering unit 302 and brakes 310. Battery 604 additionally powers lights 300, attachment/implement 225, and auxiliary units 312.

Cab 606 comprises a compartment in which an operator may be seated when operating vehicle 524. Cab 606 comprises a seat 612, a steering wheel 616, a control console 618 and a roof 620. Roof 620 extends over control seat 612 and control console 618. In some implementation, roof 620 may be raised and lowered.

Lights 300, steering unit 302, propulsion unit 304, PTO unit 306, hydraulic power unit 308, brakes 310 and auxiliary unit 312 are described above. In the particular example illustrated, PTO unit 306 comprises a power take off 623 (shown in FIG. 10). In the example illustrated, lights 300 comprise hood lights 624 and roof lights 626.

As with vehicle 224, vehicle 524 include sensors that capture the control gestures made by the operator 42. In the example illustrated, such sensors comprise cameras 530-1 (shown in FIG. 5), 530-2 (shown in FIG. 6) and 530-3 (shown in FIG. 11) (collectively referred to as cameras 530). Cameras 530 capture images of operator control gestures as well as the surrounding environment and output signals to processor 32. Camera 530-1 extends on a front edge of roof 620 to capture regions in front of vehicle 524. Camera 530-2 extends on a rear edge of roof 620 to capture images of regions rearward of vehicle 524. Cameras 530-3 extend on underside of roof 620 to capture side regions of vehicle 524. Such cameras output signals identifying the location of the operator 42. In some implementations, vehicle 524 may include additional or fewer cameras at the same or different locations and alternative forms of sensors.

Vehicle state and feedback system 525 comprises indicators 570-1, 570-2, 570-3, 570-4 (collectively referred to as indicators 570), indicator 572, indicator 574, and state/feedback instructions 568. Indicators 570 comprise display screens located at the four corners of roof 620. Indicators 570-1 and 570-2 face in a forward direction and are angled towards their respective opposite sides of vehicle 524. Indicators 570-3 and 570-4 face in a rearward direction and are angled towards their respective opposite sides of vehicle 524. Indicators 570 present graphics and text which may be viewed by the operator 42 at various positions about vehicle 524.

Indicator 572 comprises an elongate bar or strip that wraps around a front of the hood 601 and the sides of hood 601 of vehicle 524, wherein the bar or strip may be selectively illuminated under the control of processor 32. In some implementations, indicator 572 is actuated between an illuminated and a non-illuminated state to provide feedback to the operator 42 who may be remote from vehicle 524, not within cab 606. In some implementations, indicator 572 was actuatable between different colors or shades of colors to provide status information to operator 42. In some implementations, indicator 572 is actuatable between different brightness levels or is actuatable so as to flash or flash at different frequencies to provide status information to operator 42.

Indicators 574 comprise speakers/microphones. In the example illustrated, indicators 574 are located on underside of roof 620 proximate steering console 618. Indicators 574 provide audible status information to an operator remote from vehicle 524. In some implementations in which indicators 574 also serve as microphones, indicators 574 may serve as input devices for the remote operator, whereby the operator may provide audible instructions or commands and wherein processor 32 uses speech recognition to identify such commands and carry out such commands.

In some implementations, lights 526 may serve as additional indicators, wherein a color, brightness, blinking frequency, or the like of such lights 526 may be controlled to provide status information to the operator 42. In some implementations, additional visible indicators, such as light emitting diode lights, light bars or the like may be utilized to provide status information based upon the current state of vehicle 524, its implements 225, its components 300, 302, 304, 306, 308, 310, 312 and/or the positioning of operator 42 or the positioning of implement 225 as based upon images captured by cameras 530.

State/feedback instructions 568 comprise software, code or logic elements on a circuit board provided in the non-transitory computer-readable medium 540. Instructions 568 direct processor 32 to output various control signals controlling the actuation or state of indicators 570, 572 and 574. For example, processor 32, following instructions 568, may indicate a first state of vehicle 524 by providing indicator 572 with a first brightness, color, on/off state and/or blinking frequency and may indicate a second different state of vehicle 524 by providing indicator 572 with a second different brightness, color, on/off state and/or blinking frequency. For example, indicator 572 may be illuminated to have a green color when traveling forward and illuminated to have a red color when stopped. By way of another example, indicator 572 may be illuminated to have a green color when the power takeoff is operating or when an implement is being powered and may have a red color when the power takeoff is no longer operating or when an implement is no longer being powered or driven.

Processor 32, following instructions 568, may indicate a first state of vehicle 524 or second state of vehicle 524 by displaying graphics or text on one or multiples of indicators 570. Such status information provided by indicators 570, 572, and 574 may include the speed or rate at which the vehicle is traveling, the speed or state of an implement and/or the state of any of lights 300, steering unit 302, propulsion unit 304, PTO unit 308, brakes 310 and/or auxiliary unit 312. Such feedback or status information provided by indicators 570, 572 and 574 may include a confirmation of receipt or capture of gestures from the operator (either operator anatomy 44 and/or input device 248), a confirmation of recognition of such gestures, an indication that such commands are about to be executed, a request for the operator to repeat such gestures or to move so as to be more centrally located within the field of view of cameras 530 when providing such gestures, or an indication that the commands associated with such gestures will not be carried out given the current state of vehicle 524 or the operator's position relative to vehicle 524 and/or its implements. Different indicators may be utilized to provide different types of status information to the operator.

In one implementation, processor 32, following instructions contained in medium 540, utilizes images from camera 530-1 to identify the positioning of rows of plants and to output control signals to steering unit 302 and propulsion unit 304 to automatically drive vehicle 524 (and any attachment/implement 225) between and along the rows of plants (such as crop plants, trees and the like). In one implementation, processor 32, following instructions contained in medium 540, utilizes images from camera 530-1 to identify the positioning or location of operator 42 and the movement of operator 42. Processor 32, following the instructions contained in medium 540, may further block or allow other commands from operator 42 (based upon input gestures) based upon the position or movement of operator 42. In some implementations, processor 32, following instructions contained in medium 540, may output control signals causing propulsion unit 304 and steering unit 302 to move vehicle 524 so as to follow the movement of operator 42 at a preselected or operator selected distance. In some implementations, processor 32 may control propulsion unit 304 and brakes 310 to substantially match the speed at which the operator is moving. In some implementations, processor 32, following instructions contained in medium 540, may utilize images captured by any of cameras 530 to identify animals or other obstructions, wherein processor 32 outputs control signals to steering unit 302 and propulsion unit 304 to control the movement of vehicle 524 so as to avoid such animals or obstructions. In some implementations, processor 32 may utilizes signals from any of cameras 530 to control the lighting provided by lights 624, 626. In some implementations, processor 32 may utilize the signals from any of cameras 530 and additional signals from a provided global positioning system to automatically, without operator intervention, drive vehicle 524 to and from a worksite or field, to or from a storage lot, shed, garage or the like (a home location) for vehicle 524 or to or from a charging site or location for charging battery 604.

In some implementations, processor 32 may utilize the identified positioning of operator 42 or of animals or other obstructions so as to control brakes 310, PTO unit 306, auxiliary unit 312 or attachment/implement 225. For example, in one circumstance, the attachment/implement 225 may comprise a sprayer spraying herbicides, insecticides, fungicides or the like. In response to the detection of the presence of an operator or animal, processor 32 may temporarily cease the movement of vehicle 524 and/or the spraying operation until the operator animal is a predefined distance from the vehicle 524 or its implement 225. In some implementations, processor 32 may automatically cease the operation of power take off 623 in response to images from cameras 530 indicating that the operator, another person, or an animal are within a predefined distance from the power take off 623. In some implementations, processor 32, following instructions contained in medium 540, may utilize images captured by any of cameras 530 (plus any other sensors provided on vehicle 524) to control the actuation of an attachment/implement 225. For example, processor 32 may identify the various locations of feed troughs and may control the actuation of an auger or other device of a pulled or attached implement 225 to unload feed at particular times and locations into the feed troughs. As a result, processor 32 facilitates the automation of tasks.

In some implementations, indicators 570 or 572 may provide information to an operator 42 in circumstances where the operator's current identified position would prevent him or her from viewing or determining such information. For example, an operator positioned at the front of vehicle 524 may be provided with information on indicators 570-1 or 570-2 about the state of an implement 225 at the rear of vehicle 524. An operator positioned at the rear of vehicle 524 or at one side of vehicle 524 may be provided with status information on selected indicators 570 about the state of an implement, another operator or environment at the front of vehicle 524 or at the other side of vehicle 524. As a result, system 520 provides an operator remote from vehicle 524 with information that may not otherwise be viewable given the operator's current position relative to vehicle 524.

Although the present disclosure has been described with reference to example implementations, workers skilled in the art will recognize that changes may be made in form and detail without departing from disclosure. For example, although different example implementations may have been described as including features providing various benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A vehicle control system comprising:
   a vehicle operable in a first mode in which vehicle actions are controlled in response to inputs received by an input device carried by the vehicle from an operator while being boarded on the vehicle and in a second mode in which vehicle actions are controlled in response to inputs received from the operator while the operator is proximate the vehicle, but no longer boarded on the vehicle;
   a sensor carried by the vehicle and configured to output a sensed input, as sensed by the sensor, from the operator proximate the vehicle, but not boarded on the vehicle;
   a processor;
   a non-transitory computer-readable medium to direct the processor, the instructions comprising:
   remote operator input sensing instructions to direct the processor to obtain the sensed input from the sensor carried by the vehicle;
   input recognition instructions to direct the processor to recognize and associate the sensed input with a vehicle action; and
   input response control instructions to direct the processor to output control signals to the vehicle based on the sensed input to cause the vehicle to carry out the vehicle action; and an operator boarding sensor to sense the operator being no longer boarded on the vehicle, wherein the vehicle automatically switches from the first mode to the second mode in response to the operator boarding sensor indicating that the operator is no longer boarded on the vehicle.

2. The vehicle control system of claim 1, wherein the vehicle comprises a tractor having a front/rear attachment and wherein the vehicle action comprises adjustment of a state of the front/rear attachment by the tractor.

3. The system of claim 2, wherein the vehicle action comprises adjustment of a positioning of the front/rear attachment.

4. The system of claim 1, wherein the sensed input comprises a captured image of movement and/or positioning of an anatomy of the operator.

5. The system of claim 1 wherein the instructions further comprise operator identification and authorization instructions to verify authorization of the operator to provide input for the vehicle and wherein the system further comprises:
   a stored image of an authorization gesture value, wherein the operator identification and authorization instructions are to direct the processor to compare a captured image of a gesture from the operator to the stored image of the authorization gesture value.

6. The system of claim 1 further comprising an input device configured to be carried by the operator while nearby the vehicle, wherein the sensed input comprises a sensed movement and/or positioning of the input device by the operator.

7. The system of claim 6, wherein the sensor comprises a camera carried by the vehicle and wherein the sensed input comprises an image of the input device captured by the camera.

8. The system of claim 1, wherein the sensor comprises a camera carried by the vehicle, wherein the sensed input comprises an image captured by the camera and wherein the system further comprises an input device configured to be carried by the operator, the input device comprising a display to present, to the operator, the sensed input captured by a camera carried by the vehicle.

9. The system of claim 8, wherein the input device comprises a first face comprising an input indicia recognizable by the processor following the input recognition instructions and a second opposite face comprising the display.

10. The system of claim 1, wherein the vehicle comprises a tractor.

11. The system of claim 1, wherein the vehicle action is selected from a group of vehicle actions consisting of: forward velocity, backward velocity, left/right direction, braking, lights (nightlights, running lights, spotlights), signal, sounds (horn, loudspeaker), warning (flashing lights, hazard lights), implement specific actions (left sprayer on/off, right sprayer on/off), power take up, moving a discharge spout; turning on/off a power take off; adjusting a speed of a power take off; and raising/lowering of an attachment to the vehicle.

12. The system of claim 1, wherein the vehicle comprises a harvester and when the vehicle action comprises repositioning of a discharge spout of the harvester.

13. The system of claim 1, wherein the instructions further comprise operator position identification instructions to direct the processor to identify a positioning of the remote operator relative to the vehicle and to output a notification to the operator recommending that the operator move relative to the vehicle based upon the positioning.

14. The system of claim 1 further comprising a feedback system carried by the vehicle to provide different states of illumination to indicate different states of the vehicle to the operator.

15. The system of claim 1, wherein the first sensor has a first sensed area, the system further comprising:
   a second sensor carried by the vehicle and having a second sensed area different than the first sensed area, the second sensor being configured to output a second sensed input, as sensed by the second sensor, from the operator proximate the vehicle, but not carried by the vehicle;
   a first set of associated sensed inputs and first vehicle actions;
   a second set of associated sensed inputs and second vehicle actions different than the first vehicle actions,
   wherein the first set comprises a first particular sensed input associated with a particular first vehicle action not found in the second set and wherein the second set comprises a second particular sensed input associated a particular second vehicle action not found in the first set and different than the particular first vehicle action;
   wherein the input response control instructions direct the processor:
      to consult the first set and to cause the vehicle to perform the particular first vehicle action in response to receiving the particular first sensed input; and
      to consult the second set and to cause the vehicle to perform the particular second vehicle action in response to receiving the particular second sensed input.

16. The system of claim 15, wherein the particular second sensed input is the same as the particular first sensed input.

17. The system of claim 1, wherein the processor is configured to determine a state of the vehicle, the system further comprising:
   a first set of associated sensed inputs and first vehicle actions;
   a second set of associated sensed inputs and second vehicle actions different than the first vehicle actions,
   wherein the first set comprises a first particular sensed input associated with a particular first vehicle action not found in the second set and wherein the second set comprises a second particular sensed input associated a particular second vehicle action not found in the first set and different than the particular first vehicle action, and
   wherein the input response control instructions direct the processor:
      to consult the first set and to cause the vehicle to perform the particular first vehicle action in response to a determination by the processor that the vehicle is in a first particular state; and
      to consult the second set and to cause the vehicle to perform the particular second vehicle action in response to a determination by the processor that the vehicle is in a second particular state.

18. The system of claim 17, wherein the particular second sensed input is the same as the particular first sensed input.

19. The system of claim 1, wherein the input recognition instructions comprise different databases of associated gestures and vehicle commands for different individual sensors supported at different positions by the vehicle.

* * * * *